(12) United States Patent
Zhang et al.

(10) Patent No.: US 8,046,336 B1
(45) Date of Patent: Oct. 25, 2011

(54) SYSTEMS AND METHODS FOR MANAGING LOCATION DEPENDENT TRANSACTIONS

(75) Inventors: Nathan Zhang, New York, NY (US); Sreekanth Brahmamdam, Singapore (SG)

(73) Assignee: Credit Suisse Securities (USA) LLC, New York, NY (US)

( * ) Notice: Subject to any disclaimer, the term of this patent is extended or adjusted under 35 U.S.C. 154(b) by 79 days.

(21) Appl. No.: 11/283,190

(22) Filed: Nov. 18, 2005

Related U.S. Application Data

(60) Provisional application No. 60/629,376, filed on Nov. 19, 2004.

(51) Int. Cl.
*G06F 7/00* (2006.01)
*G06F 17/00* (2006.01)
*G06Q 40/00* (2006.01)

(52) U.S. Cl. .......................... 707/652; 707/648; 705/35

(58) Field of Classification Search .................. 707/204, 707/648, 651, 652; 705/35
See application file for complete search history.

(56) References Cited

U.S. PATENT DOCUMENTS

| | | | | |
|---|---|---|---|---|
| 5,909,673 | A * | 6/1999 | Gregory ........................... | 705/45 |
| 2002/0029339 | A1 * | 3/2002 | Rowe ............................. | 713/182 |
| 2003/0084073 | A1 * | 5/2003 | Hotti et al. ..................... | 707/201 |
| 2004/0098425 | A1 * | 5/2004 | Wiss et al. ..................... | 707/204 |
| 2004/0177028 | A1 * | 9/2004 | Francis et al. .................. | 705/37 |

OTHER PUBLICATIONS

Rusinkiewicz et al. Request II—a distributed database system for local area networks, Proceedings of 1986 ACM Fall joint computer conference, 1986, pp. 1179-1186, IEEE Computer Society Press.*
"Request II—A distributed database system for local area networks", Published 1986, By Marek Rusinkiewicz http://delivery.acm.org/10.1145/330000/325080/p1179-rusinkiewicz.pdf?ip=151.207.242.4&CFID=34576559&CFTOKEN=25885835&_acm_=1310485980_6bb39889dec244bb0045e17135458eef.*
Babaoglu, Ozalp, et al., "Consistent Global States of Distributed Systems: Fundamental Concepts and Mechanisms", *Technical Report UBLCS-93-1*, (Jan. 1993),40 pages.
Gray, Jim, et al., "The Dangers of Replication and a Solution", *UBLCS Technical Reports*, 173-182.
Kruchten, Philippe, "Architectural Blueprints—The "4+1" View Model of Software Architecture", *IEEE Software 12 (6)*, (Nov. 1995),42-50.
Wiesmann, M, et al., "Understanding Replication in Databases and Distributed Systems", *ICDCS IEEE Computer Society Technical Committee on Distributed Processing*, (Apr. 2000),264-274.

* cited by examiner

*Primary Examiner* — Apu Mofiz
*Assistant Examiner* — Chelcie Daye
(74) *Attorney, Agent, or Firm* — King & Spalding

(57) ABSTRACT

Disclosed herein are systems and methods for managing the distribution and synchronization of data across multiple locations. The invention uses a static, rule-based mechanism that results in fast, successful data updates in a consistent and controlled manner and without the requirement for manual reconciliation. In one embodiment the data relates to financial transactions.

40 Claims, 8 Drawing Sheets

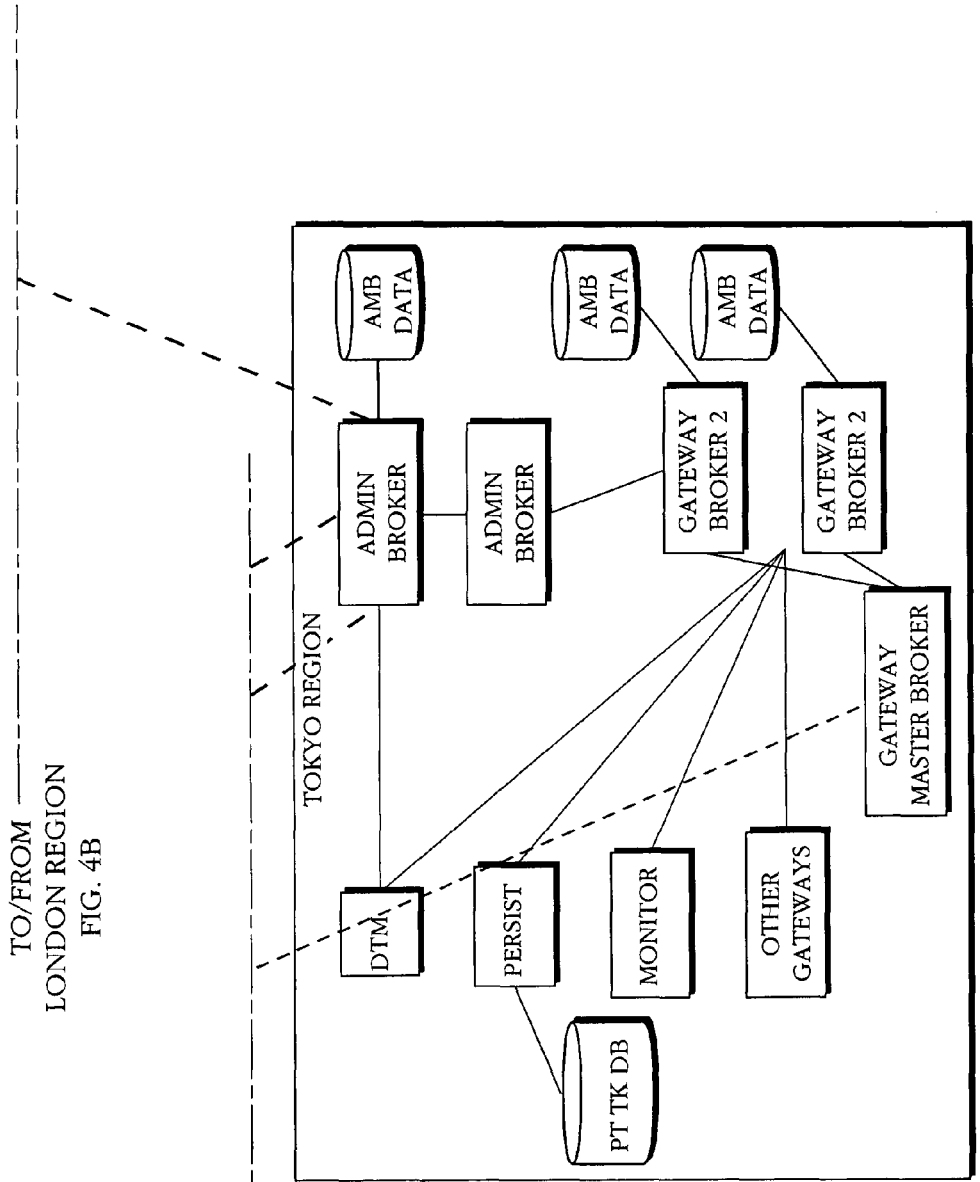

SYSTEMS AND METHODS FOR MANAGING LOCATION DEPENDENT TRANSACTIONS

RELATED APPLICATIONS

This application claims the benefit of U.S. provisional application Ser. No. 60/629,376 filed Nov. 19, 2004 by Nathan Zhang and Sreekanth Brahmamdam, titled: Systems and Methods for Managing Distributed Data for Financial Services Transactions. Said application Ser. No. 60/629,376 is hereby incorporated by reference herein.

FIELD OF THE INVENTION

The invention relates generally to electronic data management and more particularly to the management of distributed electronic data in support of transactions such as financial services transactions.

BACKGROUND OF THE INVENTION

In today's mobile environment, people often find themselves traveling for substantial periods of time. Businesses and their employees are often located in multiple geographic locations. People and businesses often have a need or desire to consummate a financial transaction, for example trading, at a particular time and from a particular location. However, the exact times and locations are not always readily predictable.

Further, a single person in a fixed location may desire to execute financial transactions in different geographical locations using an appropriate methodology, for example through an electronic network such as the Internet or by telephone. This ability to execute financial transactions in different geographies provides a user the ability to, for example, access financial services on an around-the-clock basis from a single geographic location.

However, the laws, rules and regulations of different jurisdictions often require that financial transactions be consummated only after meeting stringent compliance requirements. Meeting these compliance requirements often requires that detailed information relating to the business or party executing the transactions be collected, evaluated for compliance, and kept current. For example audit requirements in some instances mandate that at least part of a user profile be synchronized across all locations.

These compliance requirements often make it difficult for financial services institutions to provide customers with the flexibility to perform financial transactions anywhere other than their "home" jurisdiction, that is the jurisdiction where their financial account is established and maintained.

In addition, users are not sympathetic to the shortcomings of technology and desire to commit transactions such as trading even if communication between locations has broken down.

SUMMARY OF THE INVENTION

In one embodiment of the invention, there are provided methods and systems for executing a transaction, a method comprising: recognizing a transaction at an originating location which would update corresponding data in more than one location; identifying a primary location for said corresponding data which is to be updated due to said transaction; if said primary location differs from said originating location, routing said request to said primary location; committing said transaction at said primary location including updating said corresponding data at said primary location; and replicating said committed transaction at a location other than said primary location, including updating said corresponding data at said other location.

In another embodiment of the invention, there are provided methods and systems for executing transactions at a location, a system comprising: means for recognizing transactions involving corresponding data to be updated at the location of the system and at a different location; means for evaluating when, if at all, to execute said recognized transactions; and means for executing transactions and updating data based on said executed transactions.

In another embodiment of the invention, there are provided methods and systems for executing a transaction, a system comprising: two databases located in separate locations; means for recognizing transactions which update corresponding data in said two separate databases; means for determining which one of said two databases to update first in relation to the execution of a particular recognized transaction prior to updating another of said two databases; and means for executing transactions, wherein said particular recognized transaction is executed first in a location of said one database and afterwards in a location of another of said two databases.

In yet another embodiment of the invention, there are provided methods and systems for developing two databases with at least some data in the two databases synchronized, a method comprising: identifying data which is to be synchronized in the two databases; assigning primary locations to said identified data; loading said identified data from at least one source to a temporary database; and copying data from said temporary database to the two databases.

BRIEF DESCRIPTION OF THE DRAWING FIGURES

The invention is herein described, by way of example only, with reference to the accompanying drawings, wherein.

DETAILED DESCRIPTION OF THE INVENTION

Described herein are embodiments of the current invention including methods and systems for managing distributed data for transactions, and more particularly for financial transactions.

The principles and operation of managing distributed data for transactions according to the present invention may be better understood with reference to the drawings and the accompanying description. All examples given below are non-limiting illustrations of the invention described and defined herein.

Figure 1:
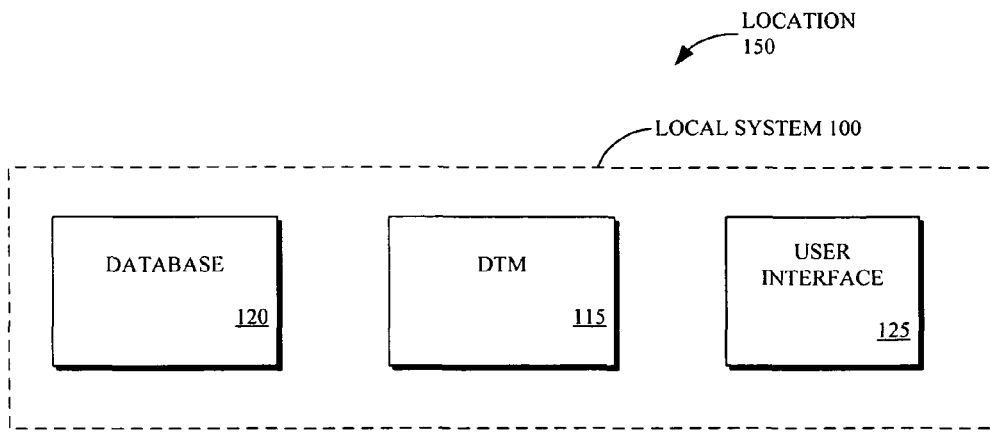
FIG. 1 is a block diagram of a local system for managing transaction data, according to an embodiment of the present invention.

FIG. 1 is a block diagram of a local system 100 for management of distributed electronic data in support of transactions, according to an embodiment of the present invention. Local system is located at location 150. Local system 100 includes a distributed transaction management gateway DTM 115, a database 120, and a user interface 125. DTM 115, database 120 and user interface 125 can each be made up of any combination of software, hardware and/or firmware that performs the functions as defined and explained herein. For example in one embodiment, DTM 115 is a process that runs in location 150. In some embodiments, local system 100 includes other modules. In some embodiments, local system 100 does not include all the modules shown in FIG. 1. For example, in one of these embodiments user interface 125 may be omitted. The division of local system 100 into the modules shown in FIG. 1 is for ease of understanding and in other embodiments any of the modules may be separated into a plurality of modules or alternatively combined with any other module.

User interface 125 can be any suitable interface which allows one or more users to interface with local system 100. For ease of description the single form of user is used below to connote both single and multiple users. A user may interface with local system 100 for any reason, for example to request a transaction, to request information on prior transactions, to receive information on successful or failed transactions (with or without first requesting the information). Depending on the embodiment, the user can be located at any distance from local system 100 with which the user interfaces. Depending on the embodiment, user interface 125 may have some parts located in a location other than location 150 or may have all parts centralized at location 150.

Location 150 is considered the originating location for a transaction if the transaction is first recognized at that location, for example if a user request for that transaction is received first at local system 100 via user interface 125, or for example if that transaction is system generated at location 150.

Database 120 includes records of transactions and optionally other information. Any types of transactions can be recorded depending on the nature of the embodiment. For example, in one embodiment, financial transactions are recorded.

In some embodiments, database 120 includes both data which is synchronized with corresponding data in other databases in a network 300 (FIG. 3) and freestanding data which does not necessarily need to be harmonized with other databases in network 300. The criteria for categorizing a particular piece of data as requiring synchronization or freestanding depend on the embodiment. For example in one of these embodiments, the criteria balance business concerns (which may prefer more data to be synchronized) with technological concerns (which may prefer less data to be synchronized).

In some of these embodiments, database 120 stores rules on which data in database 120 is synchronized with other databases in network 300. For example the rules may specify whether data in a specific table in database 120 is synchronized with other databases in network 300. As another example, assuming data in a table in database 120 is synchronized, the rules may indicate whether all rows in that table are synchronized or whether only certain rows based on data in select fields are synchronized. Continuing with the example, a DTM flag may show if a specific table (or a specific row in a table) is synchronized or not.

In some of these embodiments, only DTM 115 updates the data in database 120 which is synchronized while the freestanding data in database 120 can be updated through any means, for example through DTM 115, via direct structured query language SQL scripts, etc. In other of these embodiments any data in database 120 can be updated through any means. (The reader will understand that in some of the embodiments which only allow updating of synchronized data via DTM 115, read access may still be additionally provided through other means such as SQL)

In other embodiments, all data in database 120 is synchronized with other databases in network 300.

In some embodiments, database 120 stores the primary location for any data which can be updated due to transactions and whose updates are synchronized (thereby ensuring that the data at the primary location is updated first before updating the corresponding data in other locations in network 300). In one embodiment, the primary location for particular data is the location where the particular data is most likely to be updated. For example, data which is synchronized may have predefined key entities (such as user, company, portfolio, account, etc.) that are assigned primary locations with the assignments stored in database 120. Continuing with the example the assignment of primary locations could have been made using an administration tool of DTM 115 when creating a new user or account. As another example, if data in a table in database 120 is synchronized, there may be a primary location column in that table or a foreign key relationship to a table with primary locations. Continuing with the example, a primary lookup table may in one embodiment list user identifications and corresponding primary locations, and if the account number is received from a user instead of the user identification, the account number can be used to determine the user identification based on another table in database 120 which is then used to look up the primary location in the primary table. In some cases, a specific transaction may involve the updating of data corresponding to more than one primary location. For example, assuming key entities of user and account, the user may be associated with one primary location and the account may be associated with another primary location. In one embodiment, database 120 stores rules for deciding which primary location is given precedence in the case of multiple conflicting primary locations.

In one embodiment, if locational data is updated through DTM 115, records should be inserted using a globally unique primary key but then deleted using the descriptive unique key.

Figure 3:
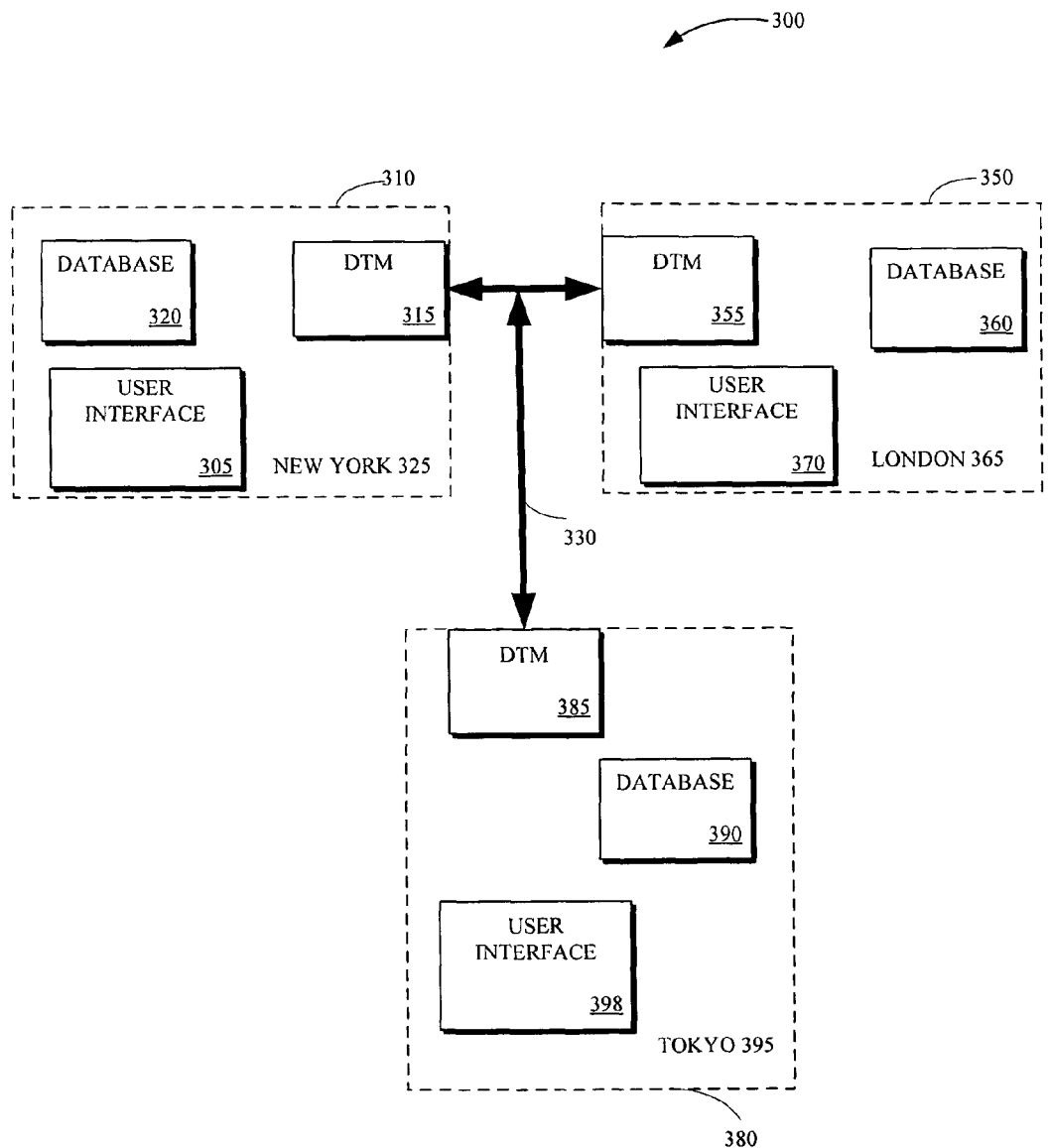
FIG. 3 is a block diagram of a network for managing distributed data for transactions, according to an embodiment of the present invention.

In some embodiments, all data in database 120 which is synchronized has one or more primary keys and/or one or more unique key fields which are the same for corresponding records in all locations in network 300 (FIG. 3). In these embodiments therefore, the rules followed to determine the primary location for corresponding synchronized data are the same in all locations.

In some embodiments, database 120 includes rules to determine whether data in a transaction is stale or not, for data which is synchronized (as will be explained in more detail below with reference to FIG. 5). The usage of these rules enables proper handling of concurrent updates to the same record gracefully. For example an optimistic concurrency control attribute OCA can be included for all data in database 120 which is synchronized. Continuing with the example, an additional OCA column can be added to tables in database 120 which are synchronized.

In some embodiments, database 120 includes a log of transactions executed by DTM 115. The log can retain documentation of transactions for any period of time, depending on the embodiment. Also depending on the embodiment, the log can include an identifier of the transaction (for example a corresponding combination of sequence numbers), the content of the transaction, etc. The log can be used, for example to re-transact a transaction, for technical support (for instance to determine why a transaction failed, etc.), etc. Depending on the embodiment, the log can include all transactions performed by DTM 115, only specific transactions performed by DTM 115 (for example only transactions for which location 150 is the primary location), etc. In some other embodiments, a log may instead or additionally be integrated into DTM 115 or elsewhere.

Figure 2:
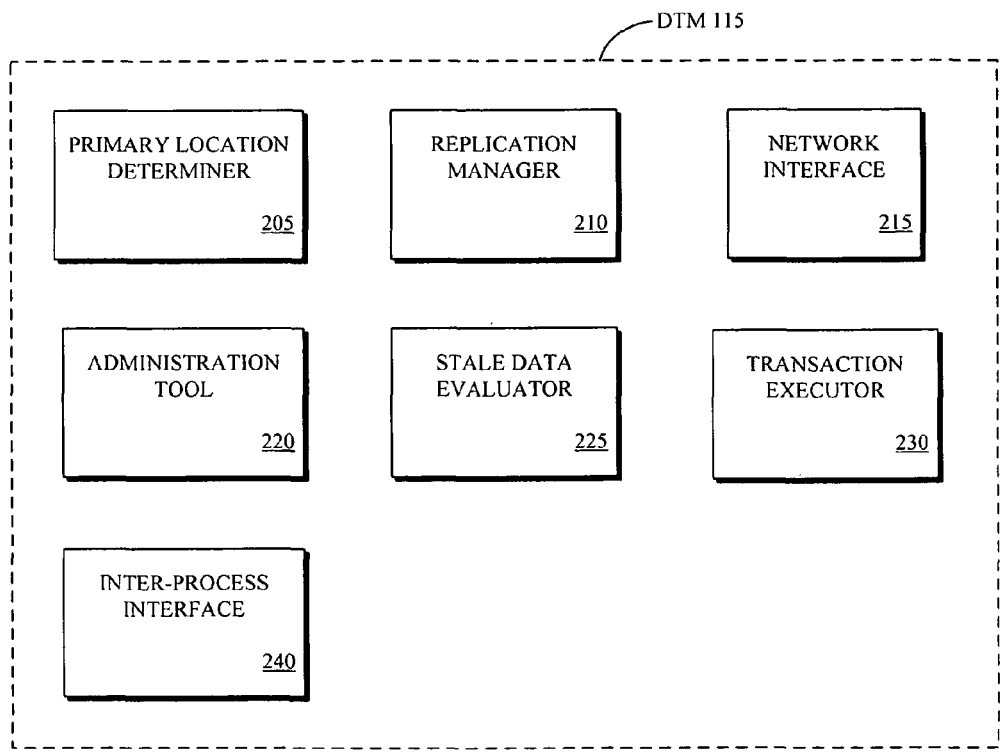
FIG. 2 is a block diagram of a distributed transaction management gateway DTM, according to an embodiment of the present invention.

FIG. 2 is a block diagram of DTM 115, according to an embodiment of the present invention. In the illustrated embodiment, DTM 115 includes a primary location determiner 205, a replication manager 210, a network interface 215, an optional administration tool 220, a stale data evaluator 225, a transaction executor 230, and an optional inter-process interface 240. Each of modules 205, 210, 215, 220, 225, 230, and 240 can be made up of any combination of software, hardware and/or firmware that performs the functions as defined and explained herein. In some embodiments, DTM 115 may include additional modules. For example, some or all of database 120, user interface 125 and/or other optional systems at location 150 may in these embodiments be integrated in DTM 115. In some embodiments, DTM 115 may not include all the modules shown in FIG. 2. For example, in these embodiments some or all of modules shown in FIG. 2 as being part of DTM 115 may be instead integrated in database 120, in user interface 125 and/or in other optional systems at location 150. The division of DTM 115 into the modules shown in FIG. 2 is for ease of understanding and in other embodiments any of the modules may be separated into a plurality of modules or alternatively combined with any other module. For example in one embodiment, network interface 215 and inter-process interface 240 may be integrated together.

Primary location determiner 205 is configured to determine the primary location for a transaction updating synchronized data. For example, in some embodiments, primary location determiner is configured to identify the key entities for all synchronized data to be updated by the requested transaction. The determination of what constitutes a key entity is predefined in some of these embodiments. For example, depending on the embodiment, key entities can be one or more of the following inter-alia: user, company, portfolio, and account. In some embodiments, primary location determiner 205 is configured to look up the primary location for the identified key entities in database 120 (see above for a description of database 120). If there is more than one key entity and the primary locations corresponding to the key entities conflict, in one embodiment, primary determiner is configured to determine which primary location takes precedence (for example by a lookup of predefined rules in database 120). For example users from one primary location may be associated with an account from another location but the rules in this example may define that the primary location of the user takes precedence over the account primary location. Alternatively or in addition, if there is a conflict, primary location determiner may be configured to divide the transaction into more than one transaction so that each separated transaction has key entit(ies) corresponding to a unique primary location. For example, assume a transaction includes both an update in one primary location and a dependent update in another primary location. Continuing with the example, the transaction can include creating both a company and users in the company where the users are allowed to have a primary location that is not the same as the company primary location. In this example the transaction can be divided into more than one transaction where the first transaction relates to creation of the company and subsequent transaction(s) relate to the addition of users to the company. As another example, primary location determiner 205 may identify the primary location based on a primary location column of a table of data to be updated by the transaction or based on a foreign key relationship to a table with primary locations. Continuing with the example, if there is a conflict in primary locations, primary determiner 205 can determine precedence among primary locations associated with the synchronized data to be updated by the transaction, for example based on rules, or primary determiner 205 can divide the transaction so that each separated transaction updates synchronized data that is associated with a unique primary location.

Replication manager 210 is configured to facilitate correct replication of transactions. For example, in one embodiment, replication manager 210 includes the capability of conforming replicated transactions to reliable and/or guaranteed message delivery on the transmitting and/or receiving end. As another example, in one embodiment replication manager 210 in addition or alternatively includes the capability of managing sequence numbers for transactions. In this embodiment, sequence number managing can include one or more of the following tasks inter-alia: keeping separate track of the number of transactions corresponding to each primary location which have been successfully updated by local system 100, incrementing a sequence number when a transaction is successfully completed where the primary location is location 150, associating a combination of sequence numbers with a transaction to be sent to other locations after completion by location 150 as the primary location, and comparing the combination of sequence numbers received in relation to a transaction received from another location with the tracked combination of sequence numbers. More details on these operations are described further below with reference to FIG. 5 and FIG. 6. As will be understood by the reader, in embodiments where replication manager 210 includes both the capability to provide guaranteed messages and sequence number management, synchronization among databases in network 300 is typically although not necessarily optimized, but in other embodiments replication manager 210 may prefer for any reason to rely on guaranteed messages (and/or reliable message), sequence management, or neither to maintain synchronization.

Network interface 215 is configured to allow DTM 115 to communicate with other DTMs at other locations in network 300 through any suitable communication network 330 (see FIG. 3). For example in one embodiment network interface 215 is configured to perform one or more of the following tasks inter-alia: sending transactions and/or sequence numbers to other locations, receiving transactions and/or sequence numbers from other locations, detecting the availability of one or more other locations, and informing other locations if location 150 is not fully functioning (for example if DTM 115 is unable to access database 120), communicating to the originating location regarding a user request if location 150 is the primary location, and requesting missing transactions from other locations (for example based on a comparison of sequence numbers performed by replication manager 210).

Communication network 330 can be any suitable combination of physical communication means and application protocol. Examples of physical means include, inter-alia: cable, optical (fiber), wireless (radio frequency), wireless (microwave), wireless (infra-red), twisted pair, coaxial, telephone wires, underwater acoustic waves, etc. Examples of application protocols include inter-alia Short Messaging Service Protocols, File Transfer Protocol (FTP), Telnet, Simple Mail Transfer Protocol (SMTP), Hyper Text Transport Protocol (HTTP), Simple Network Management Protocol (SNMP), Network News Transport Protocol (NNTP), Audio (MP3, WAV, AIFF, Analog), Video (MPEG, AVI, Quicktime, RM), Fax (Class 1, Class 2, Class 2.0), and tele/video conferencing. In some embodiments, communication network 330 can alternatively or in addition to be identified by the middle layers, with examples including inter-alia the data link layer (modem, RS232, Ethernet, PPP point to point protocol, serial line interne protocol-SLIP, etc), network layer (Internet Protocol-IP, User Datagram Protocol-UDP, address resolution protocol-ARP, telephone number, caller ID, etc.), transport layer (TCP, Smalltalk, etc), session layer (sockets, Secure Sockets Layer-SSL, etc), and/or presentation layer (floating points, bits, integers, HTML, XML, etc). For example the term "Internet" is often used to refer to a TCP/IP network. In some embodiments, communication network 330 includes one technology whereas in other embodiments communication network 330 includes a combination of technologies.

In one embodiment, network interface 215 when sending transactions and/or sequence numbers is configured to use administration brokers instead of gateway brokers to reduce the load.

Inter-process interface 240 is configured to converse with other application processes at location 150. In an embodiment where there is no need for communication with other application processes, inter-process interface 240 may be omitted.

In one embodiment, network interface 215 and optionally inter-process interface 240 use or are included in an underlying message system. As will be understood by the reader, a messaging system is an event-based communication model crafted for business applications that provide for an exchange of information between highly distributed system elements.

In one embodiment, network interface 215 and/or inter-process interface 240 sends transactions, sequence numbers and/or other messages using guaranteed message delivery and/or reliable message delivery.

Optional administration tool 220 in one embodiment allows a user to interact directly with DTM 115. For example, administration tool 220 can be used in one embodiment to create a new user, new account, and/or assign a primary location. As another example, administration tool 220 in one embodiment additionally or instead can be used to perform a manual synchronization of data. Manual synchronization allows a user (for example an operator) to synchronize data using means and/or methods in addition to or instead of the automatic synchronization performed by DTM 115 and described below. In another embodiment, administration tool 220 may be omitted or may be integrated partially or fully elsewhere, for example in user interface 125 or in other optional systems at location 150.

Stale data evaluator 225 is configured to evaluate whether data is a transaction is stale. In one embodiment, the evaluation is performed for transactions where location 150 is the primary location. In one embodiment, stale data evaluator 225 is configured to check the OCA and to reject a transaction if the transaction is attempting to update a record with an OCA value that is lower than that in database 120.

Transaction executor 230 is configured to perform transactions. A transaction may have been requested by a user, or may derive from another source. As an example of another source, the transaction may have been system generated, for example the periodic posting of fees, dividends, interest, etc. In one embodiment, transaction executor 230 is configured to perform a transaction provided the data is not stale, when location 150 is the primary location. In cases where a transaction is replicated in other locations and location 150 is not the primary location, transaction executor 230 is configured to perform the transaction in accordance with an acceptable order (as will be discussed in more detail below with reference to FIG. 6).

FIG. 3 illustrates network 300 for management of distributed electronic data in support of transactions according to an embodiment of the present invention. For simplicity of illustration, network 300 is shown as comprising three locations, namely New York 325 (New York local system 310), London 365 (London local system 350), and Tokyo 395 (Tokyo local system 380). The abbreviations NY 325, LN 365, and TK 380 are used below for New York 325, London 365 and Tokyo 380 respectively. The locations are connected through any suitable communication network 330 as discussed above, and depending on the embodiment, communication network 330 between any two locations may be the same or different than communication network 330 between other locations.

Each local system 310, 350 and 380 is an example of local system 100 discussed above. However to aid the reader in understanding the operation of network 300, each local system 310, 350 and 380 is identified by a separate reference number. Likewise, user interfaces 305, 370 and 398 are similar to user interface 125, DTMs 315, 355, and 385 are similar to DTM 115, and databases 320, 360, and 390 are similar to database 120, but all are identified by separate reference numbers to aid in reader understanding.

Databases 320, 360 and 390 in network 300 are independently available so there is no single point of failure. Moreover, the usage of multiple databases 320, 360 and 390 allows users in locations 325, 365 and 380 to all benefit from close proximity to the data, which would not be the case if there was instead a single database. As mentioned above in some cases user interface 305, 370 and/or 390 may be omitted.

Figure 4A:
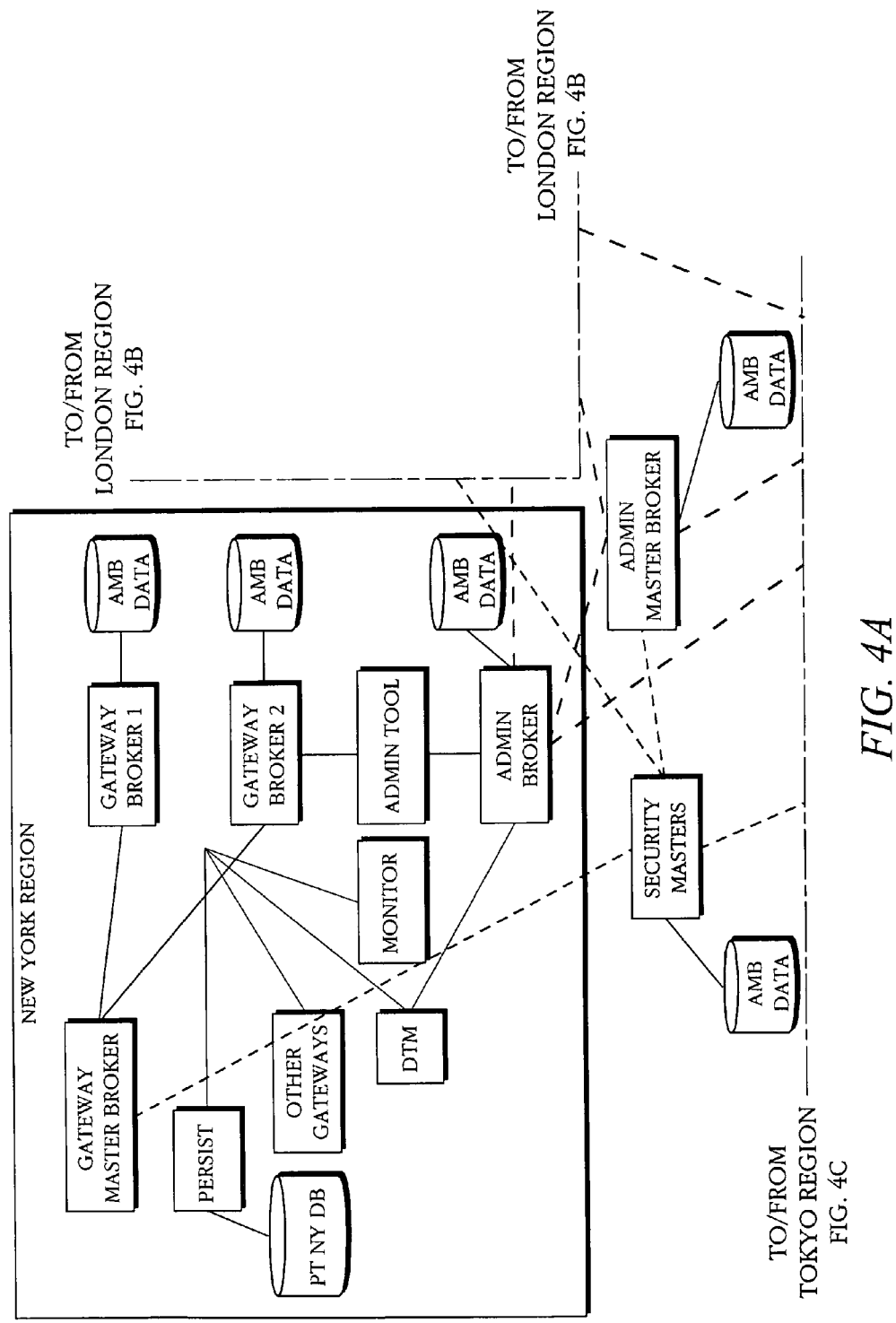
FIG. 4 is a block diagram of a more elaborate network, according to an embodiment of the present invention.
Figure 4B:
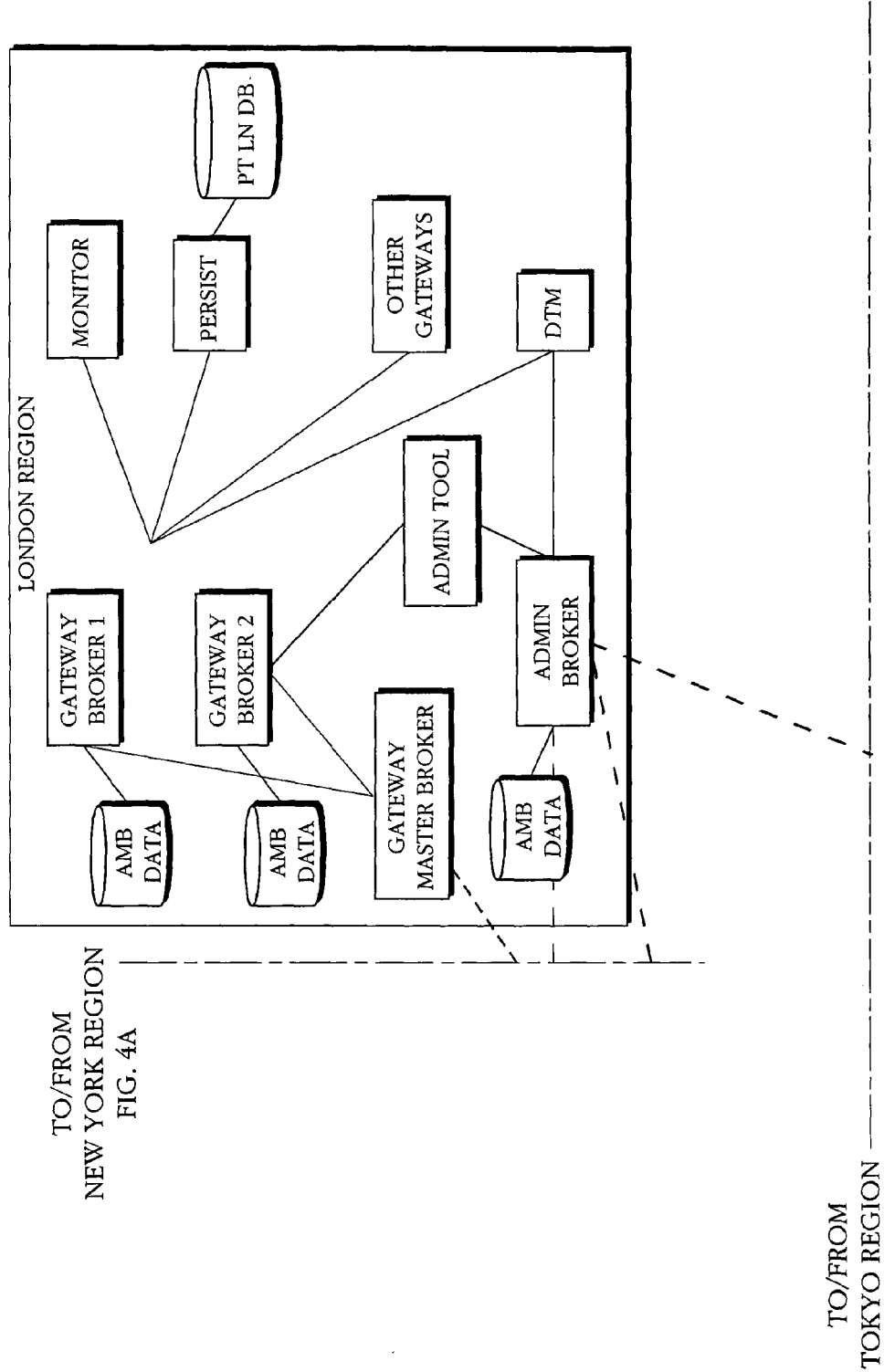

In some embodiments, network 300 can operate as a reliable component within the architecture of a more elaborate network, for example a single dealer electronic network which allows clients of a financial institution to trade many different products globally. In these embodiments, each DTM 315, 355 and 385 acts as an intelligent router of messages between the server side business logic processes (gateways) and the persistence services of each location. See FIG. 4 which shows a block diagram of a more elaborate network 400, according to an embodiment of the present invention.

As will be understood by the reader, network 300 in other embodiments can comprise more or fewer locations including or excluding the three named locations of NY 325, LN 365 and TK 395. However, for simplicity of description, the methods described below refer to these three named locations.

Figure 5:
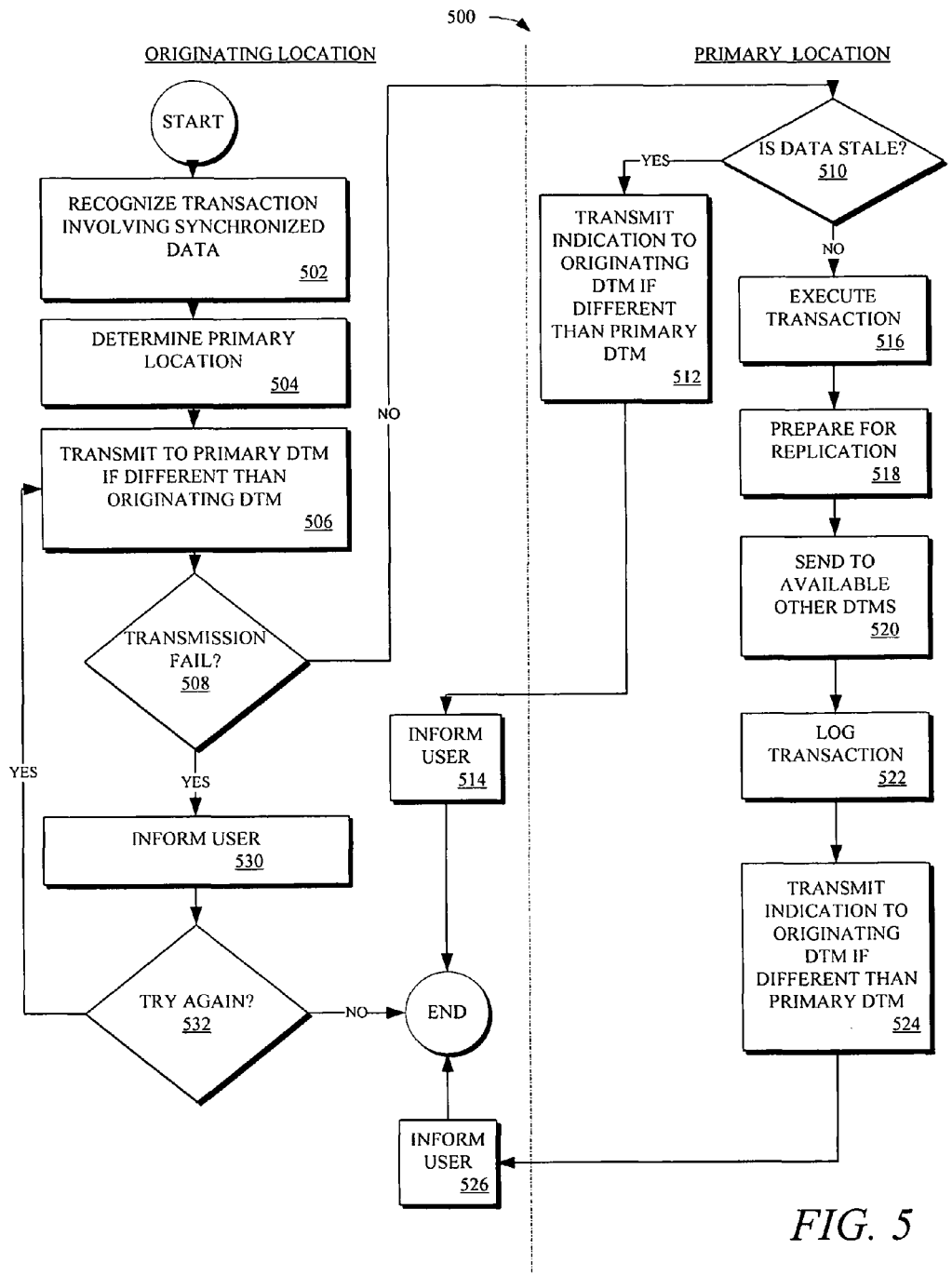
FIG. 5 is a flowchart of a method for executing a transaction at a primary location, according to an embodiment of the present invention.

FIG. 5 is a flowchart of a method 500 for executing a transaction at a primary location, according to an embodiment of the present invention. Although the originating location and primary location are shown separately in FIG. 5 with a dotted line separating stages committed by each, in some cases the primary location may be identical to the originating location. Method 500 allows multi-directional updates to data without leading to a data mismatch because although the originating location can be any location in network 300, and not necessarily the primary location, only data which is not stale is updated. Method 500 can be used for any application, for example 24 hour mission critical applications that require data to be entered and maintained from disparate locations or less critical applications.

Method 500 is performed for each transaction, for example by one or two DTM 115 located at one or two locations, depending on whether the originating location is the same as or differs from the primary location. The invention is not bound by the specific stages or order of the stages illustrated and discussed with reference to FIG. 5. It should also be noted that alternative embodiments can include only selected stages from the illustrated embodiment of FIG. 5 and/or additional stages not illustrated in FIG. 5.

FIG. 5 will be discussed in conjunction with a series of transactions presented in table 1 below. The transactions in table 1 are presented to aid the reader in understanding different aspects of an embodiment of the invention, and therefore the transactions presented are not necessarily representative of typical transactions. In addition, the format and content of table 1 are presented to aid in the understanding of the reader of an embodiment of the invention and should not be construed as binding on the invention.

TABLE 1

Example of a series of transactions

| Reference Letter | Originating location | Primary Location | Transaction Number at Primary Location | Sequence Number for LN 365 | Sequence Number for NY 325 | Sequence Number for TK 395 |
|---|---|---|---|---|---|---|
| A | TK 395 | NY 325 | 1 | 0 | 1 | 0 |
| B | TK 395 | NY 325 | Failed transmission | 0 | 1 | 0 |
| B | TK 395 | NY 325 | 2 | 0 | 2 | 0 |
| C | TK 395 | NY 325 | 3 | 0 | 3 | 0 |
| D | TK 395 | TK 395 | 1 | 0 | 3 | 1 |
| E | TK 395 | TK 395 | 2 | 0 | 3 | 2 |
| F | TK 395 | NY 325 | 4 | 0 | 4 | 2 |
| G | LN 365 | NY 325 | Rejected | 0 | 4 | 2 |

In one embodiment, the transactions shown in table 1 are executed in the order presented in table 1. The described embodiment describes the optional tracking of the number of transactions and therefore table 1 shows the tracked number of transactions. For any given row in table 1, column 5 represents the number of transactions committed at the location listed in column 3 whose primary location is LN 365, column 6 represents the number of transactions committed at the location listed in column 3 whose primary location is NY 325 and column 7 represents the number of transactions committed at the location listed in column 3 whose primary location is TK 395. Therefore the combination of sequence numbers in columns 5, 6, and 7 corresponding to each transaction represents a logical (or transaction) clock for that transaction. Note that in the described embodiment, the amount of sequence numbers in the combination equals the amount of locations in the network, since a separate count of the committed transactions associated with each primary location is maintained. In one embodiment, method 500 is repeated for each transaction.

In stage 502, a transaction is recognized as involving synchronized data. Assume that transaction A originates from a user and is received by DTM 385 of originating location TK 395 via user interface 398.

In stage 504 DTM 385 determines the primary location of transaction A. For example, assuming an embodiment where the primary location is based on the name of the user as the key entity, DTM 385 may look up the name of the user who requested transaction A in database 380 and find that the primary location for that user is NY 325.

In stage 506, DTM 385 sends transaction A to DTM 315 at NY 325, the determined primary location. The transmission is assumed to be successful (stage 508). In stage 510, DTM 315 checks if the data to be updated in database 320 due to transaction A is stale, for example by comparing the OCA value of the record to be updated by transaction A with the OCA value of database 320. It is assumed that the data is not stale so transaction A is executed in stage 516 by DTM 315. In optional stage 518, DTM 315 prepares for the replication of transaction A, for example by incrementing the sequence number representing the number of transactions successfully completed that have NY 325 as the primary location (row 2, column 6 in table 1 is incremented to "1"). In other words, in stage 518, DTM 315 increments the sequence number which represents the number of transactions successfully committed first at NY 325 (because NY 325 is the primary location for these transactions), prior to attempted replication at other locations. As another example, in stage 518, DTM 315 may in addition or instead prepare for the replication of transaction A by conforming transaction A for reliable and/or guaranteed message delivery.

In stage 520, DTM 315 sends transaction A to any other available locations (as will be described further below with reference to FIG. 6). In some embodiments, the combination of sequence numbers comprising the transaction clock (row 2, columns 5, 6, and 7) is also sent to any other available locations in conjunction with the sent transaction A. In these embodiments, the combination of sequence numbers can be sent before, at the same time or after transaction A, as long as the association with transaction A is apparent to the receiver locations. In some embodiments, transaction A is transmitted in stage 520 using guaranteed and/or reliable message delivery.

In stage 522 DTM 315 optionally logs transaction A. In some embodiments, DTM 315 may optionally transmit an indication to originating DTM 385 of successful execution of transaction A (stage 524), and in some of these embodiments DTM 385 may for a user-requested transaction optionally inform the user of successful execution (stage 526). In some of these embodiments, the order of stages 520, 522, and 524/526 may be interchanged.

For the remaining transactions B through G, differences in execution of method 500 for each transaction compared to transaction A will be elaborated on. For the sake of conciseness, similarities in execution of method 500 for each transaction compared to transaction A will not be re-described.

For transaction B, in stage 508 the transmission between DTM 385 (at the originating location TK 395) and DTM 315 (at the primary location NY 325) is assumed to fail. If transaction B was requested by a user, then in some embodiments the user is optionally informed of the failure (stage 530) and optionally given the opportunity to request that transmission of transaction B be reattempted (stage 532). In other embodiments with a user requested transaction B or in embodiments where transaction B is not user requested (for example system generated transactions), DTM 385 may automatically retry transmission or may abandon the attempt to transmit (i.e. DTM 385 determines whether to try again-stage 532). For example if guaranteed message delivery is used to send transactions from DTM 385 to DTM 315, attempts at delivery may continue until DTM 315 acknowledges receipt. In these other embodiments assuming a user requested transaction B, the user may also be informed of the failure (stage 530) before, after or simultaneously to execution of stage 532. In this example it is assumed that retransmission is again attempted and that on the second attempt, transaction B is successfully transmitted to DTM 315 (stage 508). The remaining stages of method 500 for transaction B are assumed to be similar to transaction A so that after the execution of transaction B and assuming an embodiment with sequence number management, the sequence number corresponding to NY 325 has been incremented to "2" (see row 4, column 6 of table 1).

Method 500 for transaction C is assumed to follow a similar course as for transaction A, so that at the end of executing transaction C and assuming an embodiment with sequence number management, the sequence number corresponding to NY 325 has been incremented to "3" (see row 5, column 6 of table 1).

Assume that that transaction D is a system generated transaction and therefore DTM 385 recognizes transaction D in stage 502 as involving synchronized data without receiving a transaction request from any user via user interface 398. In stage 504 DTM 385 (at originating location TK 395) determines that the primary location is TK 395. Because the originating location and the primary location are both TK 395, stages 506, 508, 512, 524, 530, and 532 are not relevant for transaction D and can be omitted. Because the data is assumed to not be stale (stage 510), the transaction is executed in stage 516, (assuming an embodiment with sequence number management) the sequence number corresponding to TK 395 is incremented to "1" (see row 6, column 7 of table 1) in stage 518, transaction D and/or the combination of sequence numbers comprising the transaction clock for transaction D (row 6, columns 5, 6, and 7) are sent to available other locations in stage 520, transaction D is optionally logged in stage 522 (the order of stages 520 and 522 may be interchanged), and method 500 ends for transaction D.

Next, assume that a transaction requested by a user is received by DTM 385 in stage 502 and involves synchronized data. Assume also that in stage 504 DTM 385 determines that the received transaction involves the updating of synchronized data corresponding to two primary locations, TK 395 and NY 325, and that there are no rules to govern precedence of primary location for this update. Therefore assume that DTM 385 divides the user requested transaction into two transactions E and F. Transaction E is therefore executed by DTM 385 (at primary location TK 395) and assuming sequence number management the sequence number corresponding to TK 395 is incremented to "2" (see row 7, column 7 of table 1) where the stages following stage 504 of method 500 for transaction E resemble transaction D. Transaction F is executed by DTM 325 (at primary location NY 325) and assuming sequence number management the sequence number corresponding to NY 325 is incremented to "4" (see row 8, column 6 of table 1) where the stages following stage 504 of method 500 for transaction F resemble transaction A.

For transaction G, assume that the transaction involving synchronized data was received from a user at LN 365 in stage 502, and that DTM 355 determined the primary location to be NY 325 in stage 504. Transaction G is transmitted to DTM 315 in NY 325 in stage 506. DTM 315 determines that the data to be updated by transaction G is stale (stage 510), for example by revealing that transaction G is attempting to update a record in database 320 with an OCA value lower than that of database 320. For example, assuming that transaction G involves selling an asset in an account with joint owners, DTM 325 may have already executed another transaction, for example transaction C, which sold the asset, prior to receiving transaction G. In stage 512, because the originating location LN 365 is different than primary location 325 an indication may be optionally transmitted to originating DTM 355 that transaction G was rejected. In some embodiments where transaction G was requested by a user, the user may optionally be informed of the failure in stage 514.

Figure 6:
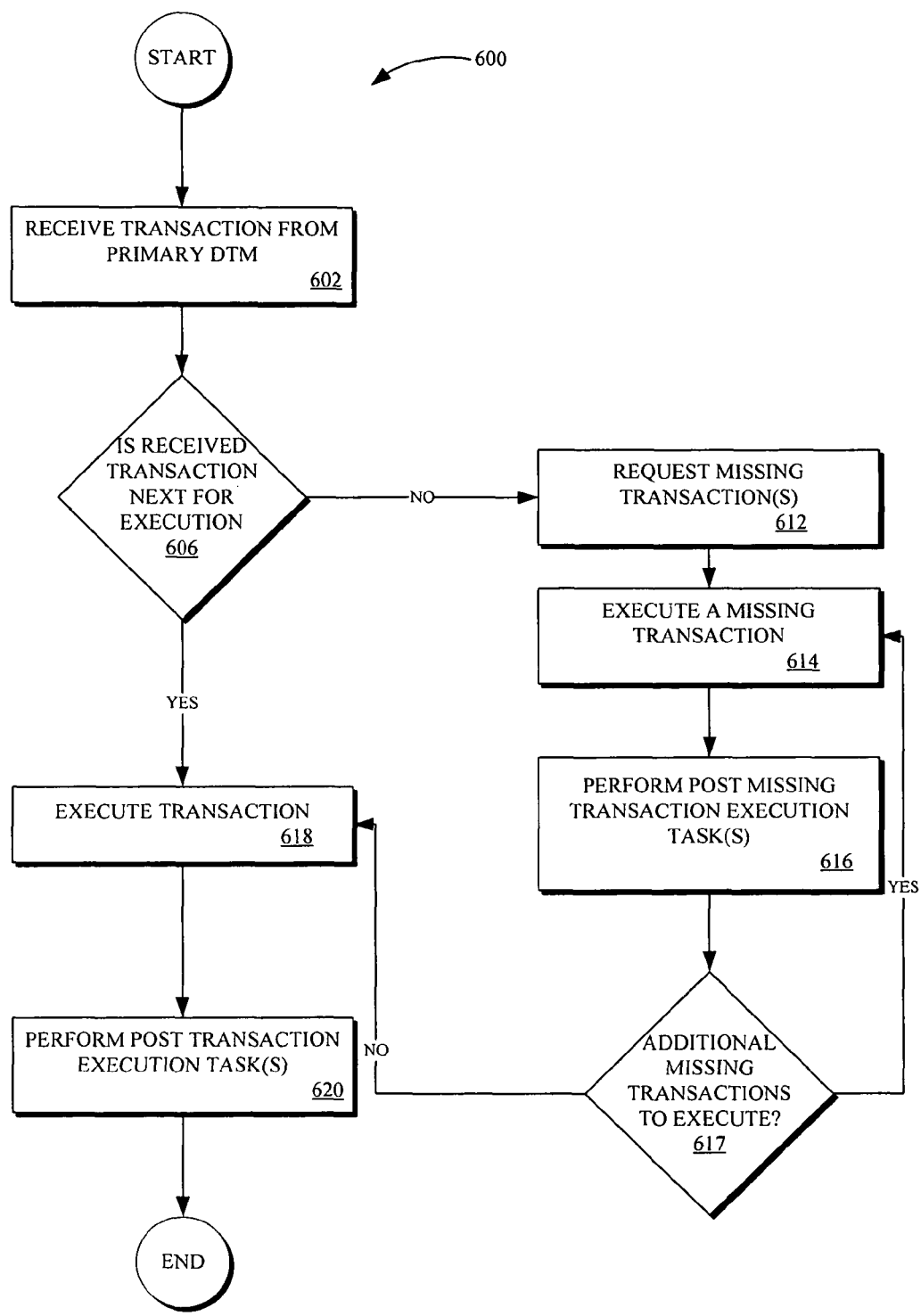
FIG. 6 is a flowchart of a method for replicating a transaction at a location other than the primary location, according to an embodiment of the present invention.

FIG. 6 is a flowchart of a method 600 for replicating a transaction at a location other than the primary location, according to an embodiment of the present invention. Because method 600 enables transactions to be replicated at all available locations, real time update to data is facilitated.

The invention is not bound by the specific stages or order of the stages illustrated and discussed with reference to FIG. 6. It should also be noted that alternative embodiments can include only selected stages from the illustrated embodiment of FIG. 6 and/or additional stages not illustrated in FIG. 6.

For further illustration, FIG. 6 is described with reference to the replication of transactions A to F at location LN 365 which is for those transactions a non-primary location. (Note that transaction G was rejected prior to execution and is therefore not replicated). Table 2 lists transactions A to F in the order received by LN 365. The format and content of the table are presented to aid in the understanding of the reader of an embodiment of the invention and should not be construed as binding on the invention.

TABLE 2

| Replication of transactions at LN 365 | | | | | | | |
| --- | --- | --- | --- | --- | --- | --- | --- |
| Stored sequence number LN | Stored sequence number NY | Stored sequence number TK | Reference letter of received transaction | Received sequence number LN | Received sequence number NY | Received sequence number TK | Action |
| 0 | 0 | 0 | A | 0 | 1 | 0 | Execute A |
| 0 | 1 | 0 | C | 0 | 3 | 0 | Hold C Request B |
| 0 | 1 | 0 | B | 0 | 2 | 0 | Execute B |
| 0 | 2 | 0 | N/A | N/A | N/A | N/A | Execute C |

TABLE 2-continued

Replication of transactions at LN 365

| Stored sequence number LN | Stored sequence number NY | Stored sequence number TK | Reference letter of received transaction | Received sequence number LN | Received sequence number NY | Received sequence number TK | Action |
|---|---|---|---|---|---|---|---|
| 0 | 3 | 0 | D | 0 | 3 | 1 | Execute D |
| 0 | 3 | 1 | F | 0 | 4 | 2 | Hold F. Request E |
| 0 | 3 | 1 | E | 0 | 3 | 2 | Execute E |
| 0 | 3 | 2 | N/A | N/A | N/A | N/A | Execute F |
| 0 | 4 | 2 | N/A | N/A | N/A | N/A | N/A |

In some embodiments, each location in network 300 stores a combination of sequence numbers representing the number of committed transactions at that location. As mentioned above, in one of these embodiments the amount of sequence numbers in the combination equals the amount of locations in the network, since a separate count of the committed transactions associated with each primary location is maintained. To facilitate understanding of these embodiments, in table 2 the first column represents the number of transactions committed at LN 365 whose primary location is LN 365. The second column represents the number of transactions committed at LN 365 whose primary location is NY 325 and the third column represents the number of transactions committed at LN 365 whose primary location is TK 395. The fourth column lists the reference letter of any transaction received at LN 365. The fifth, sixth and seventh columns represents the combination of sequence numbers received in association with the received transaction referenced in the fifth column (These sequence numbers are the same as listed in table 1 for the referenced transactions). The eighth column represents the action taken by DTM 355 at LN 365 when the referenced transaction is received.

In embodiments where sequence numbers are tracked, method 600 does not require transactions to necessarily arrive in order because there is a check whether there are missing transactions prior to executing a new transaction. In these embodiment network 300 does not need to necessarily depend on guaranteed message delivery to remain synchronized. As shown in the eighth action column of table 2, in some instances a new transaction is held pending the receipt of missing transactions, so as to automatically synchronize the data. As should be understood from the description here, the capability for automatic synchronization whenever a new transaction occurs minimizes the need for reconciliation of data and minimizes the need for human (operator) intervention.

In stage 602, transaction A is received by DTM 355 from DTM 315 (located in the primary location for transaction A—NY 325). For example in some embodiments stage 602 executed by DTM 355 may correspond to state 520 executed by DTM 315 for transaction A. Depending on the embodiment, transactions may always arrive directly from the primary location (for transaction A—NY 325) or may sometimes arrive via other locations. In one embodiment, a received transaction include a flag indicating the primary location of the transaction so that even if a transaction does not arrive directly from the primary location, the primary location of the received transaction is evident to the receiving location.

In an embodiment which includes the tracking of sequence numbers, the combination of sequence numbers associated with transaction is also received, before, at the same time or after transaction A is received.

In stage 606, DTM 355 determines if transaction A can be executed once received. For example in one embodiment, DTM 355 relies on guaranteed message delivery and performs any received transactions in order received (i.e. the received order is assumed to be an acceptable order of execution). In other embodiments, DTM 355 also or instead uses sequence numbers to determine an acceptable order of executing transaction A which may or may not be the same order as the order received. In some of these other embodiments, an acceptable order would mean that a transaction that is dependent on another transaction is performed after the other transaction, whereas two independent transactions could be performed in any order. Depending on the embodiment, DTM 355 could be more or less cautious in classifying a transaction as possibly dependent on an earlier transaction.

For example, in some embodiments DTM 355 may compare the received combination of sequence numbers "010" (row 2, columns 5, 6, and 6) for transaction A with the stored combination of sequence numbers "000" (row 2, columns 1, 2, and 3) to determine if the received transaction was received in an acceptable order for execution.

In one of these embodiments, transaction A is determined to have been received in an acceptable order for execution provided two conditions are fulfilled (if more caution in avoiding earlier execution of possibly dependent transactions is desirable) or provided at least the first condition is fulfilled (if less caution in avoiding earlier execution of possibly dependent transactions is desirable). The first condition is that transaction A is not executed before earlier transactions with the same primary location (NY 325). Referring to the sequence numbers, the first condition is that the received sequence number corresponding to the primary location must be exactly one higher than the stored sequence number corresponding to the primary location. For transaction A the primary location is NY 325 represented by the middle sequence number in the combination of sequence numbers. In this example, the received middle sequence number is "1" (row 2 column 6 of table 2) and is exactly one higher than the stored middle sequence number of "0" (row 2 column 2 of table 2). Note that the checking for fulfillment of the first condition also is a check against repetition of a transaction received more than once. The second condition is that transaction A is not executed prior to earlier transactions with different primary locations than transaction A. Referring to the sequence numbers, the second condition is that the received sequence numbers corresponding to all locations other than the primary location of transaction A must be the same or lower than the stored sequence numbers for those other locations. For transaction A, the other locations are LN 365 (represented by the leftmost sequence number) and TK 395 (represented by the rightmost sequence number). In this example the received sequence numbers for both other locations LN 365 (row 2, column 5 of table 2) and TK 395 (row 2, column 7 of table 2) are the same as the stored sequence numbers for those locations (row 2, column 1 and row 2, column 3 respectively). As the reader will understand, it is less likely that transaction A will be dependent on a transaction with a different primary location than that transaction A will be dependent on a transaction with the same primary location, so checking for the fulfillment of the second condition is an additional cautionary step to the checking for the fulfillment of the first condition. In the described embodiment, it is assumed that DTM 355 checks for the fulfillment of both conditions.

Because DTM 355 has determined in stage 606 that transaction A can be executed, DTM 355 executes transaction A in stage 618. In stage 620, DTM 355 optionally performs one or more post execution tasks, for example logging transaction A, informing the user of successful replication, and/or in embodiments with sequence numbers incrementing the stored sequence number corresponding to NY 325, the primary location for transaction A to "1" (row 3, column 2 of table 2).

For remaining transactions B through F, differences in execution of method 600 for each transaction compared to transaction A will be elaborated on. For the sake of conciseness, similarities in execution of method 600 for each transaction compared to transaction A will not be re-described.

Next, it is assumed that transaction C arrives at DTM 355 from DTM 315 located in primary location NY 325 (stage 602). In stage 606, assuming an embodiment with sequence numbers and where a check of the two conditions stated above is made, the received combination of sequence numbers "030" (row 3, columns 5, 6, and 7) is compared to the stored combination "010" (row 3 columns 1, 2, and 3). Although the second condition is fulfilled, the first condition is not fulfilled ("3" is more than one higher than "1"). Therefore DTM 355 holds off on executing transaction C, and requests any missing transactions with the same primary location in stage 612. In one embodiment DTM 355 requests any missing transactions from DTM 315 at primary location NY 325. In one embodiment, DTM 355 requests any missing transactions by sequence number. Note that in this example, network 300 does not require transactions to arrive in order from a particular primary location and that here, transaction C arrives before transaction B even though both transactions arrive from primary location NY 325.

In stage 614, the missing transaction B is received and executed. In one embodiment, DTM 355 looks out for transaction B and executes transaction B without first comparing the received combination sequence number corresponding to transaction B with the stored combination of sequence numbers. In this embodiment after executing transaction B, DTM 355 increments the stored sequence number corresponding to NY 325 (which is primary for transaction B) in stage 616 to "2" (row 5, column 2 of table 2). (Other post execution tasks may also be optionally performed for transaction B in stage 616). Since there are no other missing transactions (stage 617) and therefore the two conditions are now met for transaction C, transaction C can also be executed in stage 618. The stored sequence number corresponding to NY 325, which is primary for transaction C, is incremented in stage 620 to "3" (row 6, column 2 of table 2) and possibly other post execution tasks for transaction C are performed.

In an alternative embodiment, once the missing transactions are requested in stage 612, DTM 355 does not specifically look out for the missing transaction B but ends method 600 for transaction C (i.e. stages 614 through 620 are omitted). In this embodiment the receipt of transaction B begins a new execution of method 600 (stage 602). In stage 606, the received combination of sequence numbers corresponding to transaction B is compared to the stored combination of sequence numbers. Because the two conditions are met for transaction B, the transaction is executed in stage 618, the stored sequence number corresponding to the primary location for transaction B is incremented to "2" in stage 620 (row 5, column 2), and possibly other post execution tasks for transaction B are performed. In this embodiment, there are two additional stages after stage 620 (i.e. stages 622 and 624). In stage 622, DTM 355 determines if there are any held transaction(s) which now fulfill the two conditions stated above and if yes executes the transaction(s). In this example, transaction C would be executed. In stage 624, DTM 355 increments the stored sequence number corresponding to the primary location for the transaction(s) executed in stage 622 (row 6, column 2), and possibly performs other post execution tasks. Stages 622 and 624 are iterated if there are additional held transaction(s) which fulfill the two conditions subsequent to the previous incrementing of a sequence number. Conversely, if in stage 622 it is determined that any held transaction(s) still do not fulfill the two conditions stated above, the held transaction(s) continue to be held until missing transaction(s) which allow the held transaction(s) to fulfill the two conditions are received and executed.

Next, it is assumed that transaction D arrives at DTM 355 from DTM 385 (with primary location TK 395) in stage 602. Method 600 is executed for transaction D. Assuming an embodiment with sequence numbers and where a check for the two conditions is made, because transaction D fulfills the two conditions stated above in stage 606, transaction D is executed in stage 618, the stored sequence number corresponding to TK 395 is incremented in stage 620 to "1" (row 7, column 3 of table 2), and possibly other post execution tasks are performed.

Next, it is assumed that transaction F arrives at DTM 355 from DTM 315 (since the primary location for transaction F is NY 325) in stage 602. In stage 606, assuming an embodiment with sequence numbers and where a check for the two conditions is made, DTM 355 compares the received combination of sequence numbers corresponding to transaction F "042" (row 7, columns 5, 6, and 7) with the stored combination of sequence numbers "031" (row 7, columns 1, 2, and 3). In this case, the first condition is fulfilled because "4" is exactly one greater than "3" for primary location NY 325, but the second condition is not fulfilled because "2" is greater than "1" for non-primary location TK 395. Therefore in stage 612, DTM 355 requests the missing transaction for example from the transmitter of transaction F (in this example DTM 315) or from the DTM at the primary location of the missing transaction (in this example DTM 385 at TK 395). In one embodiment, DTM 355 can request the missing transactions by sequence number. In stage 614 the missing transaction E is received and executed, the stored sequence number corresponding to the primary location of transaction E is incremented in stage 616 to "2" (row 9, column 3) and possibly other post execution tasks for transaction E are performed. There are no additional missing transactions (stage 617) so in stage 618, transaction F is then executed and in stage 620, the stored sequence number corresponding to the primary location of transaction F is incremented to "4" (row 10, column 2) and possibly other post execution tasks for transaction F are performed.

In an alternative embodiment, once the missing transactions are requested in stage 612, DTM 355 does not specifically look out for the missing transaction E but ends method 600 for transaction F (i.e. stages 614 through 620 are omitted). In this embodiment the receipt of transaction E begins a new execution of method 600 (stage 602). In stage 606, the received combination of sequence numbers corresponding to transaction E is compared to the stored combination of sequence numbers. Because the two conditions are met for transaction E, the transaction is executed in stage 618, the stored sequence number corresponding to the primary location for transaction E is incremented in stage 620 to "2" (row 9, column 3), and possibly other post execution tasks are performed for transaction E. In this embodiment, there are two additional stages after stage 620, stages 622 and 624. In stage 622, DTM 355 determines if there are any held transaction(s) which now fulfill the two conditions stated above and if yes executes the transaction(s). In this example, transaction F would be executed. In stage 624, DTM 355 increments the stored sequence number corresponding to the primary location for the transaction(s) executed in stage 622 (row 10, column 2) and possibly performs other post execution tasks. Stages 622 and 624 are iterated if there are additional held transaction(s) which fulfill the two conditions subsequent to the previous incrementing of a sequence number. Conversely, if in stage 622 it is determined that any held transaction(s) still do not fulfill the two conditions stated above, the held transaction(s) continue to be held until missing transaction(s) which allow the held transaction(s) to fulfill the two conditions are received and executed.

Methods 500 and 600 described above aim to synchronize some or all of the data in databases 320, 360 and 390, for example by updating data first at the corresponding primary location, by checking that the update is not stale, by using guaranteed and/or reliable message delivery for sending transactions for replication, and/or by checking the received combination of sequence numbers corresponding to a received replication transaction and ensuring that transactions are replicated in an acceptable order. At times however data which should be synchronized may become unsynchronized (out of sync) although eventually any data which should be synchronized should converge to the same state. As noted above, in some embodiments, databases 320, 360 and/or 390 also include freestanding data which is not synchronized across network 300 and therefore is discussed with respect to out of sync conditions.

Possible events which can cause databases 320, 360 and/or 390 to be out of sync include one or more of the following inter-alia: the on disk messaging system queue for receiving transactions at a particular location is full, a DTM at a particular location is unable to transmit a transaction because of a hard disk failure, an SQL script was run in a particular location which updated synchronized data in that location outside the framework of DTM, a link between two or more locations fails, and there is a database schema mismatch (for example missing constraints).

In one embodiment regardless of the event which caused databases 320, 360 and/or 390 to be out of sync, data entered from any location prior to the advent of the event continues to be available due to the independent availability of databases 320,360, and/or 390.

For the sake of illustration an example is presented below to illustrate how network 300 may in one embodiment operate when an out of sync event occurs.

Assume that an event occurs which prevents communication with DTM 355 in LN 365. Assume, however, that DTM 385 in TK 395 and DTM 315 in NY 325 can still communicate with each other. For example communication may be prevented with DTM 355 as a consequence of the event (for example communication is prevented due to a link breakdown event) or as part of the recovery from the event (for example database 320 in NY 325 crashes and DTM 315 is intentionally isolated from DTM 355 and DTM 385 while the damage is repaired and a backup database 320 is installed).

During the time that communication is prevented with DTM 355, any update to synchronized data made by DTM 385 or DTM 315 is replicated by DTM 315 or DTM 385 respectively. Therefore synchronized data can be updated where the originating location and the primary location are TK 395 and/or NY 325, even though communication is prevented with DTM 355. In addition, if DTM 355 is working and only the link(s) with other locations (TK 395 and NY 325) is down, updates to synchronized data whose primary location is LN 365 can be made even though the link is down as long as LN 365 is also the originating location. In addition, in some embodiments, even if DTM 355 is not working, certain types of transactions involving synchronized data whose primary location is LN 365 will still be accepted and queued for later execution at DTM 355 while other types of transactions will not be accepted (where the acceptable types and non-acceptable types depend on the embodiment). As mentioned above, in some embodiments updates to data which were made prior to the event also continue to be available due to the independence of databases 320,360 and 390.

Continuing with the example, assume that the event is later rectified so that communication with DTM 355 in LN 365 is restored. If guaranteed message delivery is used, the transactions which had not been sent across communication network 330 due to the event would have been stored, for example in a guaranteed delivery database, and automatically delivered once the event is rectified. Alternatively or in addition if sequence numbers are tracked, the transactions which had not been replicated across network 300 due to the event could after the event rectification be synchronized through automatic synchronization. Alternatively or in addition, the transaction which had not been replicated across network 300 due to the event could after the event rectification be synchronized through manual synchronization. For example in one embodiment with both guaranteed delivery and sequence numbers, the transactions stored for guaranteed delivery are delivered for replication after the event rectification, and a check is made that the order of delivery is an acceptable order of execution and if not automatic synchronization is performed (for example by comparing sequence numbers and requesting missing transactions as described above with respect to method 600). In this described embodiment, only if both guaranteed delivery and automatic synchronization can not be performed properly is manual synchronization performed to fix network 300. Continuing with this embodiment, the transactions which had only been updated in both databases 380 and 320 (TK 395 and NY 325) during the communication blockage event can after event rectification be replicated in database 360. Similarly, if there had been updates to database 360 (LN 365) for synchronized data transactions during the communication blockage event, after event rectification these transactions can be replicated in databases 380 and 320.

Figure 7:
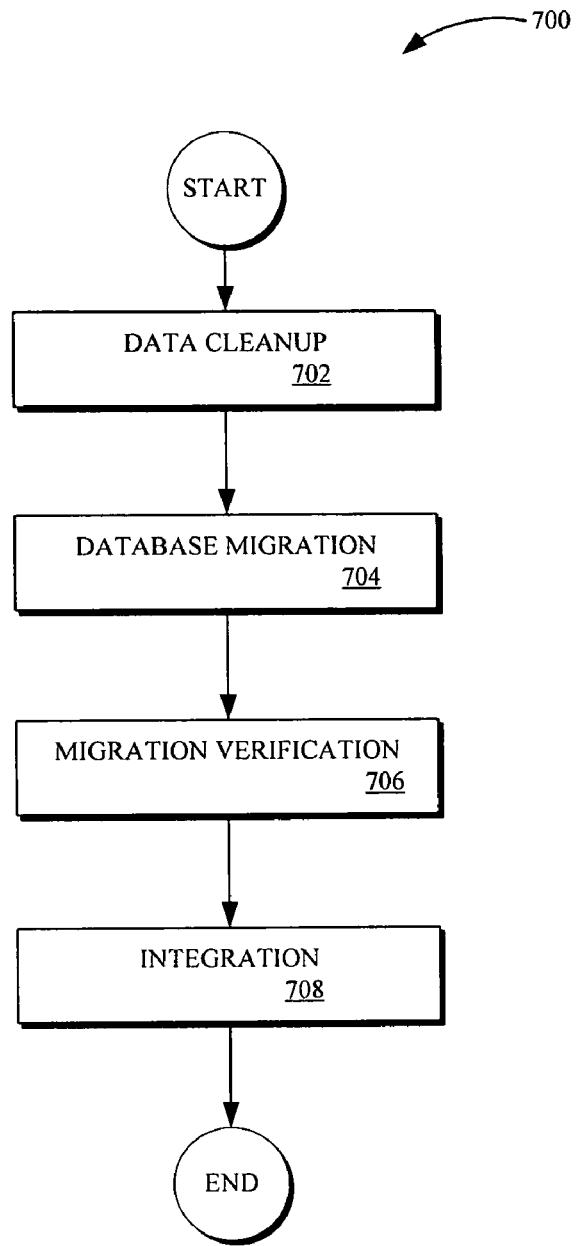
FIG. 7 is a flowchart of a method for installing the network of FIG. 3, according to an embodiment of the present invention.

FIG. 7 is a flowchart of a method for installing network 300, according to an embodiment of the present invention. In this embodiment it is assumed that prior to the development of databases 320,360, and 380 which have at least some of data thereof synchronized, data is maintained in various production databases. The invention is not bound by the specific stages or order of the stages illustrated and discussed with reference to FIG. 7. It should also be noted that alternative embodiments can include only selected stages from the illustrated embodiment of FIG. 7 and/or additional stages not illustrated in FIG. 7.

In stage 702, the data which is included in various production databases and which will be synchronized across network 300 is prepared. Preparation of the synchronized data can include one or more of the following inter-alia: addition of primary table(s), addition of primary location column(s), addition of a DTM flag column (identifying synchronized data), identification of key entities for synchronized data, assignment of primary locations for the synchronized data and/or for identified key entities, the addition of an OCA and/or concurrentStamp field(s)/column(s) to synchronized table(s) of data, and the establishment of rules for how transactions are to be handled including which data will be updated, how the primary location for data will be determined, and how cross-region data conflicts will be resolved (for example by determining precedence or splitting the transaction).

In one embodiment, the development of (at least partially synchronized) databases 320, 360 and 380 require minimal code and database changes. For example in this embodiment, only a few tables, a few columns and/or a few rules may need to be added to the data already existing in the various production databases.

In stage 704, the various production databases are merged to create a synchronized database (database migration).

In one embodiment, database migration stage 704 includes the following stages. In the first stage copies are created of all production databases. Then scripts are run to upgrade the database structure and to load static data from original sources. In the second stage, data which will be installed (replicated) in databases 320, 360 and 380 is first migrated to a temporary database. Migration scripts ensure that entities (for example user, company, account, portfolio, etc) are globally unique and that relationships between entities are preserved. In the third stage data from the temporary database is copied out to new versions of the database in each location (i.e. to databases 320, 360 and 380). In the fourth stage freestanding data, for example FX deals will be copied directly from the original version of the database for that location. In one embodiment once database migration has occurred, the primary key and any unique key fields for synchronized data should be the same for corresponding records in all locations, the corresponding OCA values for all synchronized data should be the same, and data which is supposed to be synchronized should be completely synchronized.

Optionally to ensure proper migration, one or more of the following verifications inter-alia can be made in optional stage 706: table owners visually inspect each table after migration or spot check some tables, scripts for each table can be run comparing source to destination, and another means for comparing source and destination databases can be used, such as user acceptance tests.

In one embodiment, once migration has occurred, one or more of the following inter-alia are enforced: there is restricted access to databases 320, 360 and 380, new columns to DTM tables cannot be null unless DTM clients are updated to handle the new columns, no updates to synchronized data are allowed via direct SQL (although reading data through direct SQL is allowable), and no updates to properties updated by DTM are allowed via direct SQL.

In optional stage 708 integration of DTM with existing applications occurs. Examples of integration includes one or more of the following inter-alia: integration of an existing administration tool with DTM, integration of DTM within a single dealer electronic execution system, and integration of DTM with an existing API Layer interface to execute SQL scripts against DTM.

While the invention has been described with respect to a limited number of embodiments, it will be appreciated that it is not thus limited and that many variations, modifications, improvements and other applications of the invention will now be apparent to the reader.

What is claimed is:

1. A method of executing a transaction, comprising:
receiving, by an originating management system at an originating geographic location, a transaction for updating of corresponding data in more than one geographic location, the transaction comprising user information associated with an originator of the transaction;
identifying, by the originating management system, based on the user information in the transaction, a primary geographic location associated with the originator, the identifying step comprising:
identifying, from a database of key entities at the originating geographic location, at least one key entity corresponding to the user information, each key entity identifying a different primary geographic location; and
retrieving from a plurality of precedence rules a precedence rule corresponding to the identified key entity, the precedence rule defining the order for routing the transaction to the identified primary geographic location and the order for replicating the transaction in at least one other geographic location;
routing, by the originating management system, the transaction from the originating geographic location to the identified primary geographic location in accordance with the retrieved precedence rule and the identified key entity and in response to a determination that the identified primary geographic location differs from the originating geographic location;
executing, by a primary management system at the identified primary geographic location, the transaction, the executing step comprising updating the corresponding data at the identified primary geographic location; and
replicating, by the primary management system, the executed transaction in the one other geographic location different from the identified primary geographic location in accordance with the retrieved precedence rule, the replicating step comprising updating corresponding data at each of the other geographic locations, thereby ensuring that the corresponding data at the identified primary geographic location is the same as the corresponding data at each of the other geographic locations.

2. The method of claim 1, wherein the executing step comprises:
determining whether the transaction is stale; and
executing the transaction in response to a determination that the transaction is not stale.

3. The method of claim 2, wherein the determining step comprises:
checking an optimistic concurrency control attribute "OCA" value of a record that would be updated due to the transaction; and
executing the transaction if the checked OCA value is at least as high as an OCA value of a database at the identified primary geographic location.

4. The method of claim 1, further comprising the step of, preparing the transaction for replication when the executing step for the transaction at the identified primary geographic location has been successfully completed.

5. The method of claim 4, wherein the preparing step comprises incrementing a sequence number that represents a number of transactions successfully committed first at the identified primary geographic location prior to being replicated at each other geographic location.

6. The method of claim 1, further comprising the step of, logging the transaction when the executing step for the transaction at the identified primary geographic location has been successfully completed.

7. The method of claim 1, wherein the receiving step comprises receiving at the originating geographic location a user request to execute said transaction.

8. The method of claim 1, further comprising the step of transmitting the executed transaction to each other geographic location via guaranteed message delivery.

9. The method of claim 1, wherein the replicating step comprises the steps of:
    receiving the transaction at each other geographic location;
    determining whether the received transaction is next in sequence to be executed at the other geographic location in accordance with the retrieved precedence rule; and
    executing the received transaction at the other geographic location in response to a determination that the received transaction is next in sequence to be executed at the other geographic location.

10. The method of claim 9, wherein the determining step comprises the steps of:
    receiving in connection with the transaction a sequence number corresponding to the identified primary geographic location, wherein the received sequence number represents a number of other transactions successfully executed first at the identified primary geographic location;
    comparing the received sequence number with a stored sequence number corresponding to the identified primary geographic location, wherein the stored sequence number represents a number of other transactions successfully executed, first at the identified primary geographic location, and which had already been replicated at the other geographic location; and
    replicating the received transaction if the received sequence number corresponding to the identified primary geographic location is exactly one higher than the stored sequence number corresponding to the identified primary geographic location in accordance with the retrieved precedence rule.

11. The method of claim 9, wherein the determining step comprises the steps of:
    receiving in connection with the transaction a combination of sequence numbers, wherein each sequence number in the received combination represents a number of other transactions successfully executed first in one of the more than one geographic locations;
    comparing the received combination of sequence numbers with a stored combination of sequence numbers, wherein each sequence number in the stored combination represents a number of other transactions committed first at a different geographic location, and wherein data in the database in the other geographic location has already been updated for all transactions counted in the stored combination; and
    replicating the received transaction if the received sequence number corresponding to the identified primary geographic location is exactly one higher than the stored sequence number corresponding to the identified primary geographic location in accordance with the retrieved precedence rule and if the received sequence numbers corresponding to all geographic locations other than the identified primary geographic location are not higher than the stored sequence numbers corresponding to the all other geographic locations.

12. The method of claim 9, further comprising the steps of, in response to a determination that the received transaction is not next in sequence to be executed at the other geographic location:
    requesting any missing transactions;
    receiving the missing transactions; and
    replicating the missing transactions prior to replicating the received transaction.

13. The method of claim 1, wherein if the other geographic location is temporarily not available, then replicating the transaction at the other geographic location once the other geographic location becomes available.

14. The method of claim 13, wherein the replicating step comprises the steps of:
    receiving the transaction from a database associated with guaranteed delivery once the other geographic location becomes available, and replicating the transaction at the other geographic location.

15. The method of claim 13, wherein the replicating step comprises, once the other geographic location becomes available, automatically synchronizing the other geographic location with the primary geographic location, including replicating the transaction at the other geographic location.

16. The method of claim 13, wherein the replicating step comprises, once the other geographic location becomes available, manually synchronizing the other geographic location with the primary geographic location, including replicating the transaction at the other geographic location.

17. The method of claim 1, further comprising the step of executing the transaction at all available geographic locations which are included in a network.

18. A system for executing transactions at a geographic location, comprising:
    means for receiving from a user a transaction for updating corresponding data at the geographic location of the system and at one or more different geographic location, wherein the transactions comprise user information associated with an originator of the transactions;
    means for evaluating when to execute the received transactions;
    means for identifying one or more primary geographic locations as the different geographic locations for the received transactions based on the user information, the identifying means comprising:
        means for identifying, from a database of key entities, at least one key entity corresponding to the user information, each key entity identifying a different geographic location; and
        means for retrieving from a plurality of precedence rules a precedence rule corresponding to the identified key entity, the precedence rule defining the order for routing the transaction to the identified primary geographic location and the order for replicating the transaction in at least one other geographic location;
    means for transmitting the transaction first to an identified primary geographic locations in accordance with the retrieved precedence rule and the identified key entity, when the identified primary geographic location is different from the geographic location where the means for receiving is located; and means for executing the transaction at the identified primary geographic location and updating corresponding data based on the executed transaction.

19. The system of claim 18, further comprising:
means for replicating the transaction at a second primary geographic location after execution at the identified primary geographic location in accordance with the retrieved precedence rule.

20. The system of claim 18, wherein the means for evaluating comprises means for deciding whether the received transaction is a stale transaction and is therefore executable, and wherein the system further comprises means for transmitting the executed transaction to different geographic locations for replication.

21. The system of claim 18, wherein the means for receiving comprises means for receiving transactions from primary geographic locations, and wherein the means for executing comprises means for replicating the received transactions.

22. The system of claim 21, wherein the means for evaluating when to execute the received transaction includes means for determining whether the received transaction can be executed in an order in which the transactions are received.

23. The system of claim 22, further comprising means for requesting one or more missing transactions which have not been received at the system, the missing transaction preceding the received transaction in execution order.

24. A network for executing a transaction, comprising:
two databases located in separate geographic locations;
means for receiving transactions that update corresponding data in each of the two separate databases, the transactions comprising user information associated with an originator of the transactions;
means for identifying based on the user information which one of the two databases to update first in relation to the execution of a particular one of the recognized transactions prior to updating the other one of the two databases, the identifying means comprising:
    means for identifying, from a database of key entities, at least one key entity corresponding to the user information, wherein each key entity identifies a different geographic location; and
    means for retrieving from a plurality of precedence rules a precedence rule corresponding to the identified key entity, the precedence rule defining the order for routing the transaction to one of the two databases and the order for replicating the transaction in the other one of the two databases;
means for executing transactions, wherein the received transactions are executed first in the a geographic location of the one of the two databases in accordance with retrieved precedence rule and the identified key entity and afterwards in a different geographic location of the other one of the two databases in accordance with the retrieved precedence rule.

25. The network of claim 24, further comprising means for tracking transactions to lower the probability of the transactions being executed prior to the execution of other transactions on which the transactions are dependent.

26. A method of executing a financial transaction, comprising the steps of:
receiving, at an original management system in an originating geographic location, a financial transaction that originated at an originating geographic location, the financial transaction requiring updating of corresponding data in more than one geographic location, the financial transaction comprising user information associated with an originator of the transaction;
identifying, based on the user information, a primary geographic location associated with the originator from the corresponding data, the identifying step comprising:
    identifying, from a database of key entities at the originating geographic location, at least one key entity corresponding to the user information, each key entity identifying a different primary geographic location; and
    retrieving from a plurality of precedence rules a precedence rule corresponding to the identified key entity, the precedence rule defining the order for routing the transaction to the identified primary geographic location and the order for replicating the transaction in at least one other geographic location;
routing, by the originating management system, the transaction from the originating geographic location to the identified primary geographic location in accordance with the retrieved precedence rule and the identified key entity and in response to a determination that the identified primary geographic location differs from the originating geographic location;
receiving, at the primary management system at the identified primary geographic location, the financial transaction that originated at the originating geographic location;
executing, by the primary management system at the identified primary geographic location, the financial transaction, the executing step comprising updating the corresponding data at the primary geographic location; and
communicating, by the primary management system, a command to replicate the executed financial transaction at another geographic location different from the primary geographic location, including updating the corresponding data at the other geographic location.

27. The method of claim 26, wherein the other geographic location is the originating geographic location.

28. The method of claim 26, wherein the communicating step comprises communicating a command to replicate the executed financial transaction at a plurality of other geographic locations other than the identified primary geographic location, including updating the corresponding data at each of the other geographic locations.

29. The method of claim 1, wherein the user information comprises user identification.

30. The method of claim 1, wherein the user information comprises user account number.

31. The system of claim 18, wherein the user information comprises user identification.

32. The system of claim 18, wherein the user information comprises user account number.

33. The network of claim 24, wherein the user information comprises user identification.

34. The network of claim 24, wherein the user information comprises user account number.

35. The method of claim 1, wherein the key entity is one or more of a user, a company, a portfolio, and an account.

36. The system of claim 18, wherein the key entity is one or more of a user, a company, a portfolio, and an account.

37. The network of claim 24, wherein the key entity is one or more of a user, a company, a portfolio, and an account.

38. The method of claim 1, wherein the identification step further comprises:
dividing the transaction into separate transactions when there are multiple key entities corresponding to the user information.

39. The system of claim 18, wherein the means for identifying further comprises:
 means for dividing the transaction into separate transactions when there are multiple key entities corresponding to the user information.

40. The network of claim 24, wherein the means for identifying further comprises:
 means for dividing the transaction into separate transaction when there are multiple key entities corresponding to the corresponding data.

\* \* \* \* \*